(12) United States Patent
Dürst et al.

(10) Patent No.: US 11,571,942 B2
(45) Date of Patent: Feb. 7, 2023

(54) ELECTROMECHANICAL ACTUATOR

(71) Applicant: Schaeffler Technologies AG & Co. KG, Herzogenaurach (DE)

(72) Inventors: Kerstin Dürst, Burghaslach (DE); Manuel Schmitt, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 233 days.

(21) Appl. No.: 16/966,534

(22) PCT Filed: Oct. 16, 2018

(86) PCT No.: PCT/DE2018/100848
§ 371 (c)(1),
(2) Date: Jul. 31, 2020

(87) PCT Pub. No.: WO2019/149298
PCT Pub. Date: Aug. 8, 2019

(65) Prior Publication Data
US 2021/0046796 A1 Feb. 18, 2021

(30) Foreign Application Priority Data

Feb. 2, 2018 (DE) ............ 10 2018 102 380.4

(51) Int. Cl.
*B60G 17/019* (2006.01)
*B60G 21/055* (2006.01)
*G01L 3/10* (2006.01)

(52) U.S. Cl.
CPC ....... *B60G 17/019* (2013.01); *B60G 21/0555* (2013.01); *G01L 3/102* (2013.01); *B60G 2202/40* (2013.01); *B60G 2206/427* (2013.01); *B60G 2206/8206* (2013.01); *B60G 2400/98* (2013.01)

(58) Field of Classification Search
CPC ............ B60G 21/0555; B60G 2202/42; B60G 2202/40; B60G 17/019; B60G 2206/427; B60G 2206/8206; B60G 2400/98; G01L 3/102
USPC .......................................... 701/1
See application file for complete search history.

(56) References Cited

U.S. PATENT DOCUMENTS

| | | | |
|---|---|---|---|
| 8,770,603 B2 * | 7/2014 | Wittmann | B60G 17/019 280/5.506 |
| 11,130,383 B2 * | 9/2021 | Stubenvoll | B60G 17/019 |
| 2001/0029791 A1 * | 10/2001 | Sezaki | G01L 5/221 73/862.333 |
| 2021/0070128 A1 * | 3/2021 | Stubenvoll | B60G 21/0555 |

FOREIGN PATENT DOCUMENTS

| | | |
|---|---|---|
| DE | 3620412 A1 | 12/1987 |
| DE | 102012202094 A1 | 8/2013 |
| DE | 102013219761 B3 | 1/2015 |
| DE | 102014203207 A1 | 8/2015 |

(Continued)

*Primary Examiner* — Paul N Dickson
*Assistant Examiner* — Caitlin Anne Miller

(57) ABSTRACT

An electromechanical chassis actuator, for example an actuator of a roll stabilizer, for a motor vehicle has a torque measuring arrangement based on the inverse magnetostrictive principle. At least one electronic unit has a printed circuit board which is connected at least indirectly to an actuator housing through a rivet connection.

12 Claims, 2 Drawing Sheets

(56) References Cited

FOREIGN PATENT DOCUMENTS

| | | | |
|---|---|---|---|
| DE | 102015203207 A1 | 8/2015 | |
| DE | 102014212365 A1 | 12/2015 | |
| DE | 102014221129 A1 | 4/2016 | |
| DE | 102014222708 A1 | 5/2016 | |
| DE | 102015203096 A1 | 8/2016 | |
| DE | 102015209310 A1 | 11/2016 | |
| DE | 102015222068 A1 | 5/2017 | |
| DE | 102016201886 A1 * | 8/2017 | |
| DE | 102018104886 B3 * | 7/2019 | |
| DE | 102018218598 A1 * | 2/2020 | ........... B60G 17/019 |
| EP | 2013598 B1 | 2/2012 | |
| WO | WO-2018130353 A1 * | 7/2018 | ......... B60G 21/0555 |
| WO | WO-2018206209 A1 * | 11/2018 | ........... B60G 17/019 |

* cited by examiner

ELECTROMECHANICAL ACTUATOR

CROSS-REFERENCE TO RELATED APPLICATIONS

This application is the U.S. National Phase of PCT Appln. No. PCT/DE2018/100848 filed Oct. 16, 2018, which claims priority to DE 10 2018 102 380.4 filed Feb. 2, 2018, the entire disclosures of which are incorporated by reference herein.

TECHNICAL FIELD

The disclosure relates to an electromechanical actuator suitable for use in a motor vehicle.

BACKGROUND

An actuator is known, e.g., from DE 10 2014 221 129 A1. The known actuator is part of an active roll stabilizer and has an electronic unit consisting of different sections. A first section of the electronic unit represents a rotating and a second section a non-rotating component.

An active roll stabilizer with electronic components rotating in the same direction is also known from DE 10 2014 222 708 A1. In this case a sensor provided for measuring a torsional moment is arranged on a planet carrier wall of a planetary gear. The electronics is a printed circuit board with magnetic field sensors arranged thereon.

A further roll stabilizer, which uses the inverse magnetostrictive effect for torque measurement, is disclosed in DE 10 2013 219 761 B3. In this case, in addition to a torque, the lateral forces in relation to the longitudinal axis of the stabilizer are also taken into account.

Various designs of electromechanical roll stabilizers for motor vehicles are also described in DE 10 2015 222 068 A1 and DE 10 2015 209 310 A1.

A circuit arrangement for operating a magnetoelastic sensor is described in DE 36 20 412 A1. This circuit arrangement should be designed in such a way that the dependence of a sensor signal on the distance between a sensor coil and a measurement object is largely suppressed.

From EP 2 013 598 B1 a force measuring device for measuring the force in solid state drives is known. This force measuring device consists of a piezoresistive, amorphous carbon layer.

SUMMARY

It is desirable to obtain an electromechanical actuator, in particular an actuator of an active roll stabilizer, for a motor vehicle that is further developed compared to the state of the art as mentioned, in particular with regard to manufacturing aspects and utilization of installation space.

An actuator consists of a torque measuring arrangement based on the inverse magnetostrictive principle, which has at least one electronic unit. The electronic unit has a printed circuit board which is at least indirectly connected to an actuator housing of the actuator through a rivet connection. The printed circuit board is a printed circuit that is equipped with electronic components of the electronic unit. The printed circuit board is a non-rotating component of the actuator.

In principle, the rivet connection can be made either by elements that are an integral part of a carrier element or by separate elements, i.e., rivets. In the latter case, the carrier element is preferably a flat element, which is fixed in the actuator housing and connected to the printed circuit board by a number of rivets. It is also possible to design the carrier element as an integral part of the actuator housing. In this case the carrier element is a metal part. Otherwise the carrier element can be made of metal or plastic.

Irrespective of the material from which the carrier element is made or the material combination from which the carrier element is constructed, a gap is formed between the printed circuit board and the carrier element in a preferred design. This gap is advantageous in terms of cooling the printed circuit board. It also improves the possibilities for absorbing deformations that may occur during actuator operation, especially within a roll stabilizer or other chassis actuator, e.g., due to mechanical loads and/or temperature influences.

The printed circuit board may be placed in the actuator housing in such a way that a surface normal of the printed circuit board is aligned to be orthogonal to the longitudinal axis of the actuator. This means that the central axis of the actuator housing, which has a basic cylindrical shape, is spaced to be parallel to the printed circuit board.

The actuator is suitable for use as a chassis actuator, e.g., in a rear axle steering system or in a level control system, especially for level control. The actuator is also suitable as an actuator of an active roll stabilizer for a motor vehicle.

If the actuator is designed as a roll stabilizer actuator, the printed circuit board is preferably arranged in a space-saving manner in a housing area of the actuator housing that is tapered in comparison to a central housing area. In this way, practically the entire diameter of the central, non-tapered housing area is available for force-generating and force-transmitting components of the roll stabilizer.

For example, a brushless direct current (BLDC) motor is used as the electric motor in the electromechanical actuator. A multi-stage planetary gear or a shaft gear can be used as reduction gear within the actuator.

BRIEF DESCRIPTION OF THE DRAWINGS

In the following, an exemplary embodiment is explained in more detail by means of a drawing. Wherein.

DETAILED DESCRIPTION

Figure 1:
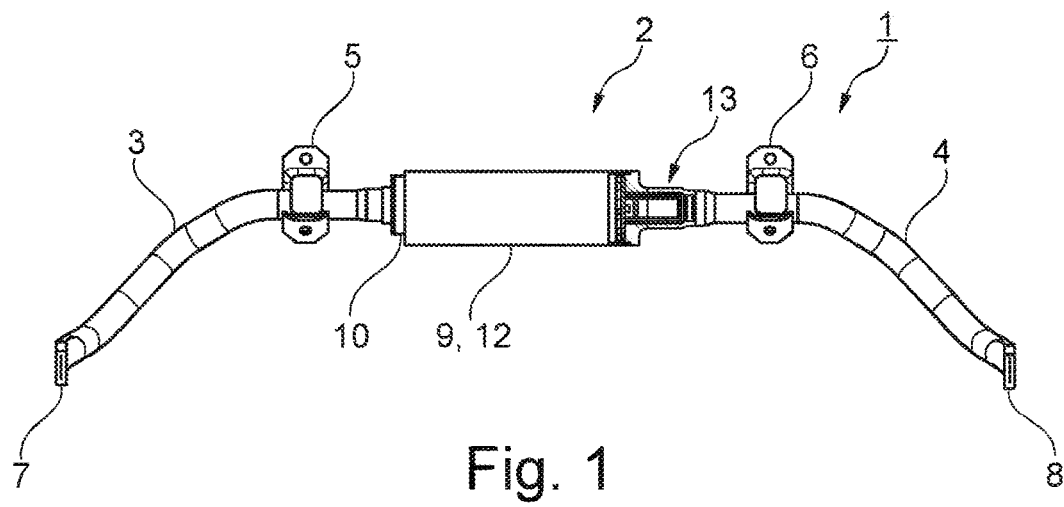
FIG. 1 shows an electromechanical roll stabilizer in top view.
Figure 2:
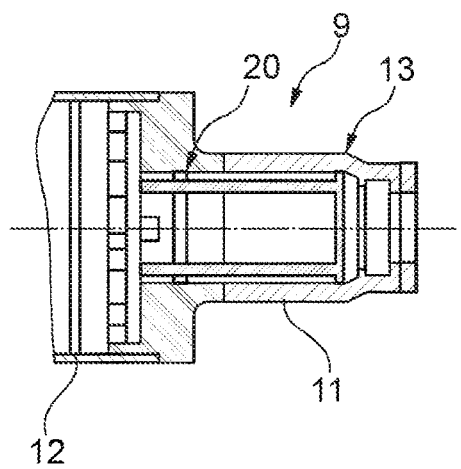
FIG. 2 shows a sectional view of an actuator of the roll stabilizer.

A roll stabilizer, marked as a whole with reference symbol 1, is intended for use as a chassis actuator in a motor vehicle. With regard to the principle function of the roll stabilizer 1, reference is made to the state of the art cited at the beginning.

The roll stabilizer 1 contains an electromechanical actuator 2. The actuator 2 has the basic shape of a cylinder with the central axis thereof substantially transverse to the longitudinal axis of the vehicle. Two stabilizer halves 3, 4 are connected to the actuator 2 in the form of torsion bar springs, which are coupled to the vehicle body not shown in the picture by means of the bearings 5, 6. The term "stabilizer half" does not mean that both stabilizer halves 3, 4 must be of the same dimensions. In fact, an off-center arrangement of actuator 2 in the chassis is also possible. At the ends of the stabilizer halves 3, 4 facing away from the actuator 2, connecting pieces 7, 8 are formed, which serve the articulated connection with wheel carriers of the motor vehicle.

An actuator housing marked with 9 of the electromechanical actuator 2 has a flange 10 on the left side thereof in FIG. 1, which is connected to the stabilizer half 3. A central, essentially cylindrical housing area 12 of the actuator housing 9 is connected to the flange 10. On the right-hand side of the central housing area 12 is a tapered, also cylindrical housing area 11, based on the arrangement in FIG. 1. The stabilizer half 4 is inserted through the tapered housing area 11 into the actuator housing 9.

Within the tapered housing area 11 there is a torque measuring arrangement 13 which provides information about a torque acting in actuator 2 according to the inverse magnetostrictive principle.

The torque measuring arrangement 13 consists of a printed circuit board 14 on which electronic components (not shown in the illustration) are arranged and thus form an electronic unit. The printed circuit board 14 is fixed to a carrier element 15 with the help of rivets 16, 17. A gap Sp is formed between the carrier element 15 and the printed circuit board 14 so that the printed circuit board 14 is largely lifted off the carrier element 15. Otherwise, namely in the area of the rivets 16, 17, the contact surfaces 18, 19 are given, in which the printed circuit board 14 contacts the carrier element 15.

Figure 3:
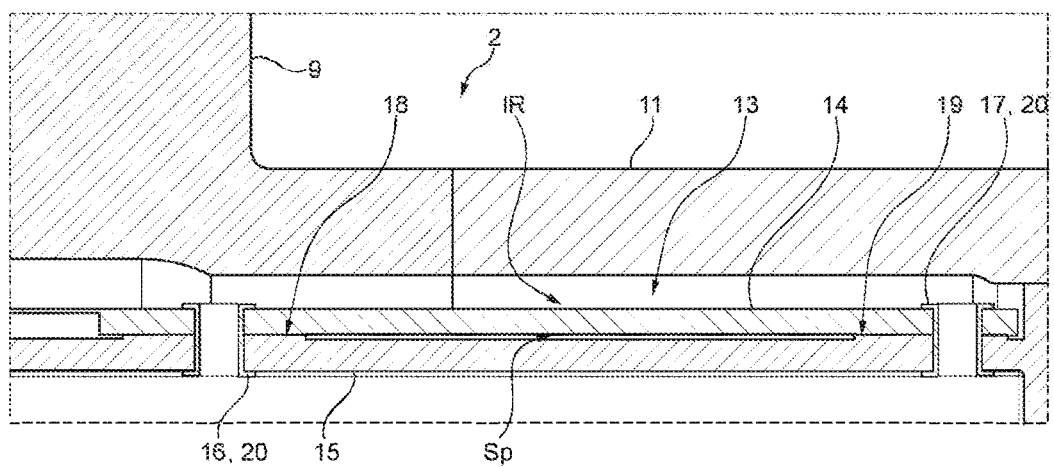
FIG. 3 shows a side view of the arrangement according to FIG. 2.

The flat carrier element 15 is fixed in the tapered housing area 11, within the interior of the actuator 2 marked IR. As can be seen in FIG. 3, the rivet connection made with rivets 16, 17 that are marked overall with 20 is extremely space-saving, especially in the direction perpendicular to the flat elements 14, 15, i.e., in the radial direction of the actuator housing 9. The center axis of the actuator 2, which coincides with the pivot axis of the stabilizer halves 3, 4, is spaced to be parallel to the printed circuit board 14 and the carrier element 15. Only a small part of the printed circuit board 14 protrudes into the central housing area 12. This housing area 12 contains the electromechanical components not shown, i.e., the electric motor and the reduction gear of actuator 2.

LIST OF REFERENCE SYMBOLS

1 Roll stabilizer
2 Actuator
3 Stabilizer half
4 Stabilizer half
5 Bearing
6 Bearing
7 Connector piece
8 Connector piece
9 Actuator housing
10 Flange
11 Tapered housing area
12 Central housing area
13 Torque measuring arrangement
14 Printed circuit board
15 Carrier element
16 Rivet
17 Rivet
18 Distribution area
19 Distribution area
20 Rivet connection
IR Inside
Sp Gap

The invention claimed is:

1. An electromechanical actuator for a motor vehicle, having a torque measuring arrangement which is based on the inverse magnetostrictive principle and has at least one electronic unit, wherein the electronic unit has a printed circuit board which is connected at least indirectly to an actuator housing through a rivet connection, and the rivet connection comprises a number of rivets by means of which the printed circuit board is fixed to a flat carrier element connected to the actuator housing, and a gap is formed between the printed circuit board and the carrier element is a region spaced away from the rivets.

2. The electromechanical actuator according to claim 1, wherein the carrier element is made of plastic.

3. The electromechanical actuator according to claim 1, wherein the carrier element is made of metal.

4. The electromechanical actuator according to claim 1, wherein a surface normal to the printed circuit board is oriented orthogonally to a longitudinal axis of the actuator housing.

5. The electromechanical actuator according to claim 1, wherein the actuator is designed as a chassis actuator.

6. The electromechanical actuator according to claim 5, wherein the actuator is part of a roll stabilizer.

7. The electromechanical actuator according to claim 6, wherein the printed circuit board is arranged in a housing region of the actuator housing which is tapered with respect to a central housing region.

8. An electromechanical actuator comprising:
a housing; and
an inverse magnetostrictive torque measuring arrangement having a printed circuit board which is connected to the housing via a rivet connection; and
the rivet connection comprises a number of rivets by means of which the printed circuit board is fixed to a flat carrier element connected to the housing; and
a gap is formed between the printed circuit board and the carrier element.

9. The electromechanical actuator according to claim 8, wherein the carrier element is made of plastic.

10. The electromechanical actuator according to claim 8, wherein the carrier element is made of metal.

11. The electromechanical actuator according to claim 8, wherein a surface normal to the printed circuit board is oriented orthogonally to a longitudinal axis of the actuator housing.

12. A roll stabilizer comprising:
an actuator housing;
a carrier connected to the actuator housing; and
an inverse magnetostrictive torque measuring arrangement having a printed circuit board which is connected to the carrier via a rivet connection; and
the actuator housing includes a central housing region and a tapered housing region; and
the printed circuit board is arranged in the tapered housing region.

* * * * *